United States Patent [19]

Shannon

[11] 4,286,918
[45] Sep. 1, 1981

[54] IMPLEMENT TRANSPORTER

[76] Inventor: Jefferson C. Shannon, P.O. Box 808, Yazoo City, Miss. 39194

[21] Appl. No.: 52,145

[22] Filed: Jun. 26, 1979

[51] Int. Cl.³ .............................................. B60P 3/00
[52] U.S. Cl. .................................. 414/742; 172/446; 414/680
[58] Field of Search ............... 414/469, 471, 477, 541, 414/544, 550, 680, 682, 728, 742, 743, 744 R; 172/311, 248, 446, 456, 491, 625

[56]  References Cited

U.S. PATENT DOCUMENTS

| 3,576,267 | 4/1971 | Blevins et al. | 414/680 |
| 3,727,698 | 4/1973 | Van Selus | 172/491 X |

Primary Examiner—Robert G. Sheridan
Attorney, Agent, or Firm—Cohn, Powell & Hind

[57] ABSTRACT

An implement transporter including a trailer carried by two wheels or a pair of rear wheels and a pair of front wheels on axes of rotation with a lifting mechanism for lifting an implement carried by the trailer. One end of the arm is pivotally connected to the trailer at one side at the rear of the trailer. The lifting mechanism holds the implement with its center of gravity spaced from the pivot in a direction towards the opposite end of the arm. The arm is pivotable from a lifting position to a transport position. In the transport position, the center of gravity of the implement is located forwardly of the axes of the rear wheels. A hydraulic arm is pivotally attached at one end to the arm and pivotally attached at the other end to the trailer at a point rearwardly and inwardly from the arm pivot for selective rotation of the arm. The arm is located longitudinally substantially at said one side of the trailer when in the transport position. The lifting mechanism includes a lifting frame and a second pivot operatively connected to the lifting frame. A second hydraulic arm is operatively connected to the lifting frame for raising the lifting frame and attached implement, and moving the implement horizontally closer to the second pivot and for subsequently tilting the lifting frame and implement forwardly and upwardly about the second pivot so that the implement is located close to said one trailer side when the arm is moved to the transport position.

12 Claims, 8 Drawing Figures

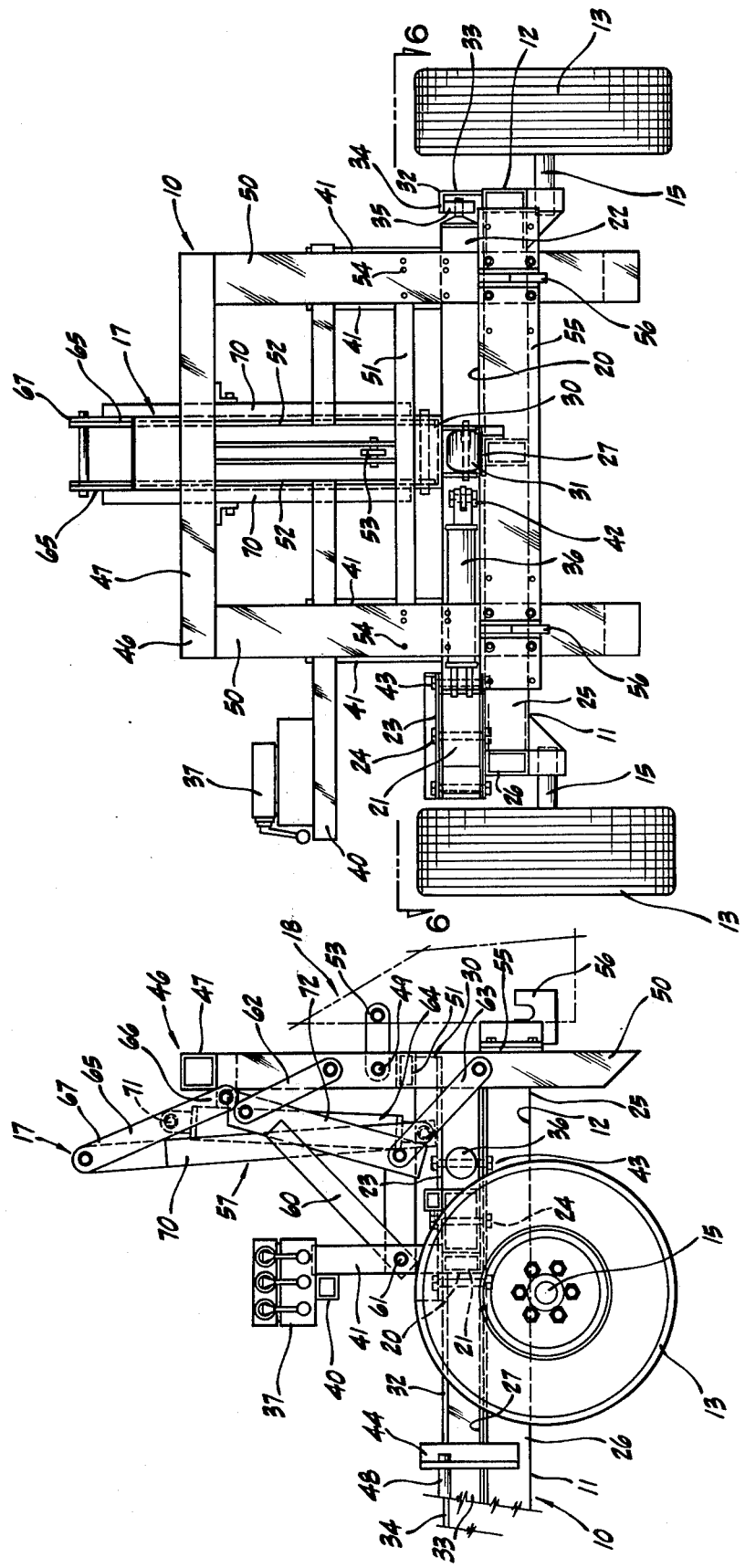

IMPLEMENT TRANSPORTER

BACKGROUND OF THE INVENTION

This invention relates generally to a device for transporting implements, and particularly to a trailer having a lifting mechanism for lifting an implement, and a pivot means for rotating the implement over the trailer.

A device of this general type is disclosed in U.S. Pat. No. 3,727,698. In this patent, a lifting mechanism is attached to a turntable mounted on a trailer. It is important that implements should not overhang the sides of the trailer when transporting implements on public roads. It is therefore important that the implement be held longitudinally to one side of the trailer so that it does not hang over the opposite side of the trailer. It is also important when transporting heavy implements that the center of gravity of the implement be located forwardly of the rear axle of the trailer in order to stabilize the load relative to the trailer wheels.

SUMMARY OF THE INVENTION

This implement transporter provides a lifting mechanism and rotating means capable of holding an implement close to one side of the trailer in order to provide for the transportation of implements of great width. The implement transporter also provides for the shifting of the center of gravity of the implement to a position forward of the axes of rotation of the rear wheels to provide for better load balance.

The implement transporter includes a trailer carried by two rear wheels or a pair of rear wheels and a pair of front wheels on axes of rotation. A lifting mechanism for lifting an implement is carried by the trailer. An arm having first and second ends carries the lifting mechanism. Pivot means pivotally connect the first end of the arm to the trailer at one side at the rear of the trailer. The lifting mechanism holds the implement with its center of gravity spaced from the pivot means in a direction toward the second end of the arm. The arm is pivotable from a lifting position in which the lifting mechanism holds the implement substantially transverse to the rear of the trailer and to a transport position in which the lifting mechanism holds the implement longitudinally of the trailer with the center of gravity of the implement located forwardly of the axes of the rear wheels.

In one aspect of the invention, the trailer has tandem wheels and the lifting mechanism holds the implement in the transport position with the center of gravity of the implement located forward of the midpoint between the axes of the rear wheels and axes of the front wheels.

In another aspect of the invention, a track is attached to the trailer providing an arcuate path about the pivot means. A roller is operatively connected to the arm with the roller operatively engaging the track for carrying weight applied to the arm.

Guide means operatively engages the second end of the arm for maintaining the arm in a substantially horizontal plane when the arm is pivoted about said pivot means.

In one aspect, the guide means includes an arcuate shaped retaining member about the pivot means. The retaining member includes a vertical wall member attached to the trailer, and a horizontal lip member attached to the wall member providing a bearing surface for engagement with the second end of the arm. A roller attached to the second end of the arm is engageable with the horizontal lip member for preventing vertical movement of the second end of the arm.

In one aspect of the invention, hydraulic means are operatively connected to the arm for selective rotation of the arm. The hydraulic means includes a hydraulic ram pivotally attached at one end to the arm at a point between the arm ends, the other end of the ram being pivotally attached to the trailer at a point rearwardly and inwardly from the pivot means.

The arm is located longitudinally substantially at said one side of the trailer when in the transport position. A first stop means is operatively attached to the trailer and operatively engages the arm to prevent the arm from rotating beyond the said one side of the trailer in the transport position. A second stop means is operatively attached to the trailer and operatively engages the arm to maintain the arm transverse with the rear of the trailer in the lifting position.

The lifting mechanism includes a lifting frame, a second pivot means operatively connected to the lifting frame, and a second hydraulic means operatively connected to the lifting frame for raising the lifting frame and attached implement and moving the implement horizontally closer to the second pivot means and for subsequently tilting the lifting frame and implement forwardly and upwardly about the second pivot means so that the implement is located close to said one trailer side when the arm is moved to the transport position.

In one aspect of the invention, the lifting mechanism includes a linkage assembly which operatively connects the second pivot means to the lifting frame. The lifting frame and implement are tilted forwardly and upwardly about the pivot means through the linkage assembly.

In one aspect of the invention, the linkage assembly includes a first link having first and second ends, the first end being pivotally connected to the lifting frame. A second link has a first end pivotally carried by the arm and a second end pivotally attached to the second end of the first link. A second hydraulic means is pivotally carried at one end by the arm, while the other end is pivotally connected to the first link between the ends of the first link. A bracket is pivotally carried by the arm. Means attaches the bracket to the lifting frame. The last said means includes upper and lower links, each link being pivotally attached to the bracket at one end and to the lifting frame at the other end for providing a four-sided linkage.

In one aspect, the lower link is longer than the upper link to provide for arcuate rearward then subsequent forward movement of the bottom of the lifting frame as the second hydraulic means raises the lifting frame and implement.

The bracket includes an abutment. The upper and lower links move the lifting frame against the abutment as the lifting frame is raised to move the implement closer to the second pivot means. The abutment is inclined rearwardly when the lifting frame is in its lowered position. The lifting frame is maintained against the inclined abutment when the lifting frame is raised and subsequently tilted forwardly about the second pivot means to its reclined position.

BRIEF DESCRIPTION OF THE DRAWINGS

FIG. 1 is a side elevational view of the implement transporter in the lifting position with the lifting mechanism lowered;

FIG. 2 is a rear elevational view of the implement transporter in the lifting position with the lifting mechanism lowered;

DESCRIPTION OF THE PREFERRED EMBODIMENT

Figure 6:
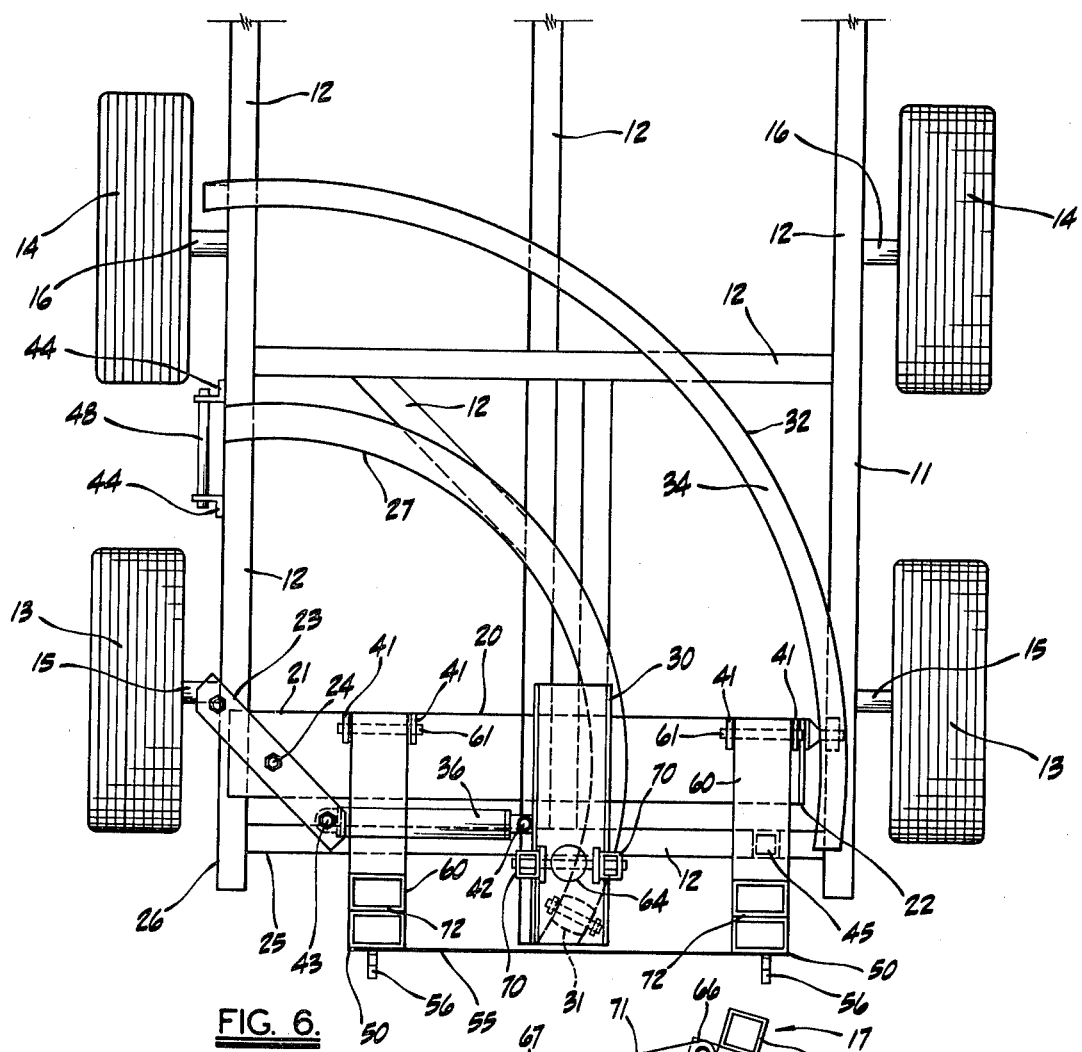
FIG. 6 is a top sectional view taken on line 6—6 of FIG. 2.

Referring now by characters of reference to the drawings and first to FIGS. 1 and 6, it will be understood that the implement transporter generally indicated by 10 includes a trailer 11 constructed of frame elements 12. It will be understood that the trailer 11 can be towed by a truck or other vehicle in a conventional manner. In the preferred embodiment, the trailer 11 is carried by two sets of wheels, rear wheels 13 and front wheels 14. The rear wheels 13 are on axes of rotation 15 which, in the preferred embodiment, are on the same axis. The front wheels 14 are on axes of rotation 16. In the preferred embodiment the front and rear wheels 14 and 13 are on tandem axes or axles 16 and 15.

A lifting mechanism generally indicated by 17, is carried by the trailer 11. An arm 20 carries the lifting mechanism 17. The arm 20 has first and second ends, 21 and 22 respectively. A pivot bracket 23 is attached to the trailer 11. A pivot pin 24, constituting first pivot means, attaches the first end 21 of the arm 20 to bracket 23 and trailer 11. The pivot means 24 is located at the rear 25 and side 26 of the trailer 11. An implement 18 is held by the lifting mechanism 17 with the center of gravity spaced from the pivot means 24 in a direction toward the second arm end 22.

Figure 8:
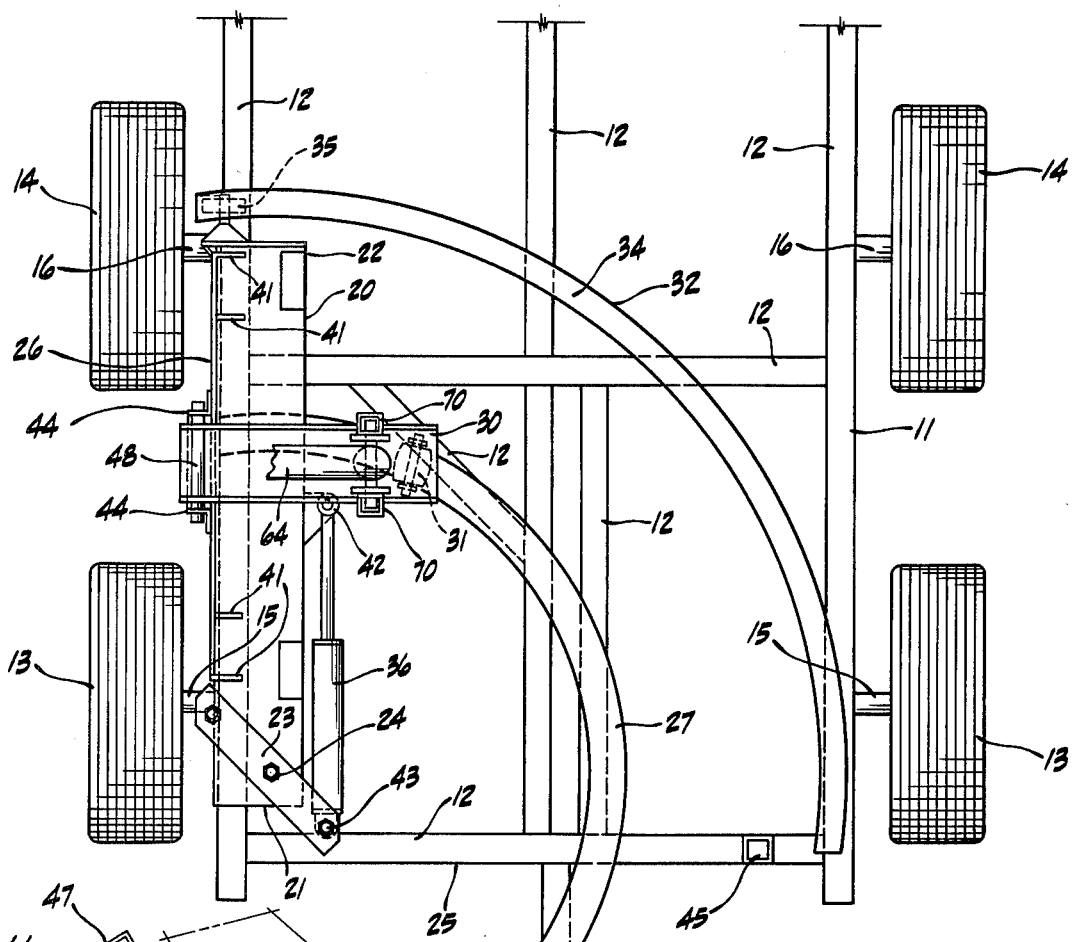
FIG. 8 is a top sectional view taken on line 8—8 of FIG. 7.

The arm 20 is pivotable from a lifting position shown in FIG. 6 in which the lifting mechanism holds the implement 18 substantially transverse to the rear 25 of the trailer 11 to a transport position shown in FIG. 8 in which the lifting mechanism 17 holds the implement 18 longitudinally of the trailer 11 with the center of gravity of the implement 18 located forwardly of the axes 15 of the wheels 13. In the preferred embodiment, the center of gravity of the implement 18 is located forwardly of the midpoint between the axes 15 of the rear wheels 13 and the axes 16 of the front wheels 14 when in the transport position. The arm 20 is located longitudinally substantially at the side 26 of the trailer 11 when in the transport position.

A track 27 is attached to the frame elements 12 of the trailer 11 to provide an arcuate path about the pivot means 24.

A channel 30 extends from and is rigidly connected to the arm 20 at a point between the ends 21 and 22 of the arm 20. A roller 31 is attached to the channel 30. The roller 31 engages the track 27 for carrying weight applied to the arm 20.

An arcuate-shaped retaining member 32 about the pivot means 24, constituting guide means, operatively engages the end 22 of the arm 20 for maintaining the arm 20 in a substantially horizontal plane when the arm 20 is pivoted about the pivot means 24. The retaining member 32 includes a vertical wall member 33 attached to the trailer 11, and a horizontal lip member 34 attached to the wall member 33. The horizontal lip 34 provides a bearing surface for engagement with a retaining roller 35 attached to the end 22 of the arm 20.

A hydraulic ram 36 and hydraulic control 37, constituting first hydraulic means, are operatively connected to the arm 20 for selective rotation of the arm 20. The hydraulic control 37 is mounted on a beam 40 which is carried by supports 41 attached to the arm 20. In the preferred embodiment, the hydraulic ram 36 is pivotally attached at one end to the arm 20 at a point 42 between the ends 21 and 22 of the arm 20. The other end of the ram 36 is pivotally attached to the trailer 11 at the bracket 23 at a point 43 which is rearwardly and inwardly from the arm pivot means 24.

Stop brackets 44 are attached to the side 26 of the trailer 11, constitutes a first stop means. The stop brackets 44 engage the arm 20 to prevent the arm 20 from rotating beyond the side 26 of the trailer 11 in the transport position. A bar 48 interconnects the brackets 44 to support the channel 30 and, hence, the arm 20 when the arm 20 is in the transport position.

A post 45 attached to the rear 25 of the trailer 11 constitutes a second stop means. The post 45 engages the arm 20 to maintain the arm 20 transverse with the rear 25 of the trailer 11 in the lifting position.

The lifting mechanism 17 includes a lifting frame 46. The lifting frame 46 includes an upper horizontal bar 47 and two spaced vertical bars 50 rigidly attached to and extending downwardly from the upper horizontal bar 47. A lower horizontal bar 51 rigidly interconnects the vertical bars 50 and is vertically spaced from the upper horizontal bar 47. A pair of horizontally spaced angle bars 52 extend vertically between and connect to the upper and lower horizontal bars 47 and 51. The angle bars 52 include opposed vertically spaced holes 49 for selective attachment of an upper hitch link 53. The vertical bars 50 are provided with spaced holes 54, for selective attachment of a load bar 55. A pair of lower hooks 56 are bolted to the load bar 55 and vertical bars 50. The hooks 56 and hitch link 53 provide a three-point hitch for attaching implements to the lifting frame 46. The lifting frame 46 is located substantially at the center of the rear 25 of the trailer 11 to balance the implement 18 between the rear wheels 13 when lifting the implement 18.

Two brackets 60 are pivotally attached to the supports 41 by pivots 61 constituting second pivot means, so as to be carried by the arm 20. Upper links 62 and lower links 63 are each pivotally connected at one end to a bracket 60 and at the other end to a vertical bar 50 of the lifting frame 46, providing a four-sided linkage. The upper and lower links 62 and 63 constitute means attaching the brackets 60 to the lifting frame 46.

A second hydraulic ram 64, constituting a second hydraulic means, is operatively connected to the lifting frame 46 for raising the lifting frame 46. It will be understood that the first and second hydraulic rams 36 and 64 are connected to the hydraulic control 37 by hoses (not shown) and that they are operated in a conventional manner. A first link 65 having first and second ends, 66 and 67 respectively, is pivotally connected at the first end 66 to the lifting frame 46. In the preferred embodiment, the first end 66 of the first link 65 is connected to the lifting frame 46 at the center of the upper horizontal bar 47. A second link 70 has one end pivotally attached to channel 30 and hence to the arm 20. The opposite end of the second link 70 is pivotally attached to the second end 67 of the first link 65. The second hydraulic ram 64 is pivotally carried at one end by the arm 20. The last said end of the ram 64 is pivotally attached to the channel 30 on the same pivot point as the second link 70. The opposite end of the second hydraulic ram 64 is pivotally connected to the first link 65 at a point 71 between the ends 66 and 67 of the first link 65. In the preferred embodiment, the point 71 is located closer to the end 66 than to the end 67.

The second hydraulic ram 64 is extended to raise the implement 18 attached to the lifting frame 46 and move the implement 18 horizontally closer to the second pivot means 61, and, subsequently tilt the lifting frame 46 and implement 18 forwardly and upwardly about the second pivot means 61 so that the implement 18 is located close to the side 26 of the trailer 11 when the arm 20 is in the transport position.

The lower link 63 is longer than the upper link 62 to provide for arcuate rearward then subsequent forward movement of the bottom of the lifting frame 46 as the second hydraulic means 64 raises the lifting frame 46 and implement 18. This particular movement allows the lifting frame 46 to clear the rear 25 of the trailer 11, and then be drawn closer to the second pivot means 61.

The brackets 60 include abutments 72. The upper and lower links 62 and 63 move the vertical bars 50 of the lifting frame 46 against the abutments 72 as the lifting frame 46 is raised to move the implement 18 closer to the second pivot means 61.

Figure 3:
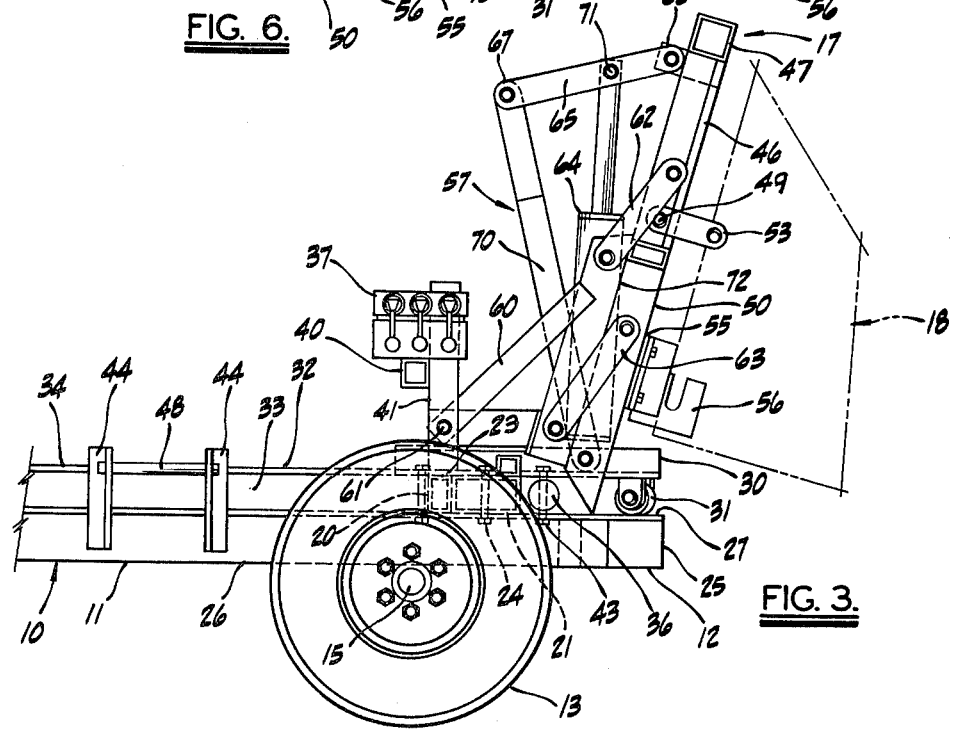
FIG. 3 is a side elevational view of the implement transporter in the lifting position with the lifting mechanism raised.
Figure 5:
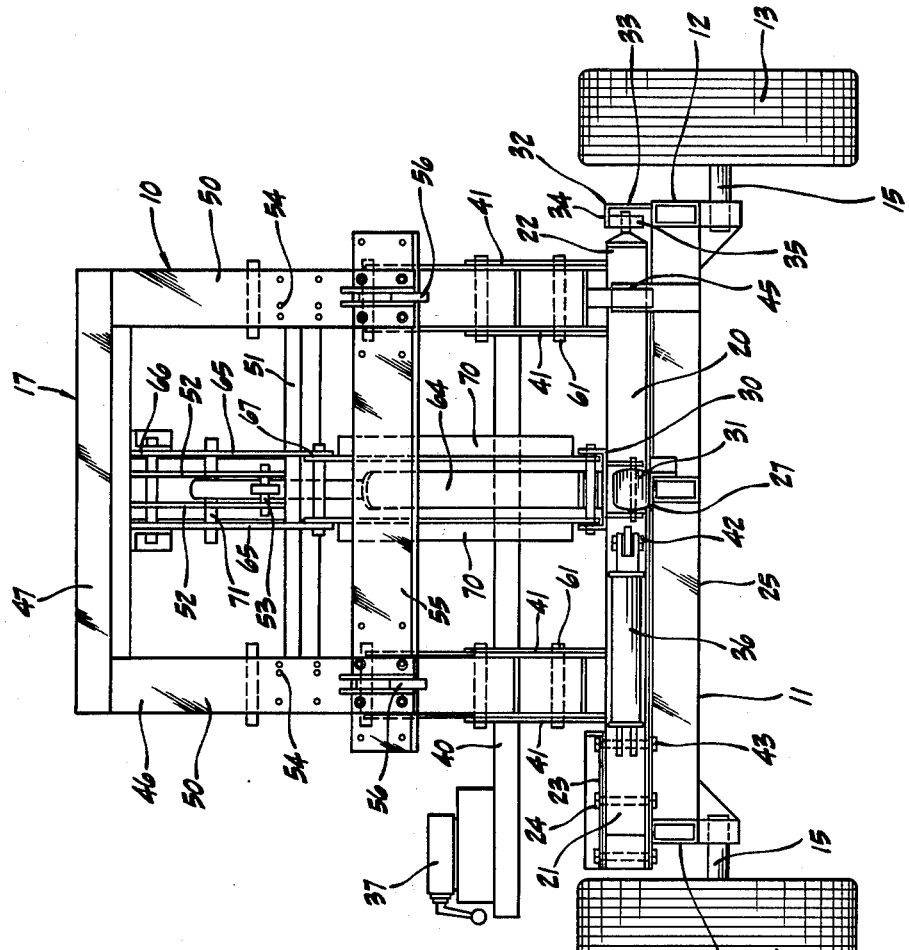
FIG. 5 is a rear elevational view of the implement transporter in the lifting position with the lifting mechanism reclined.
Figure 4:
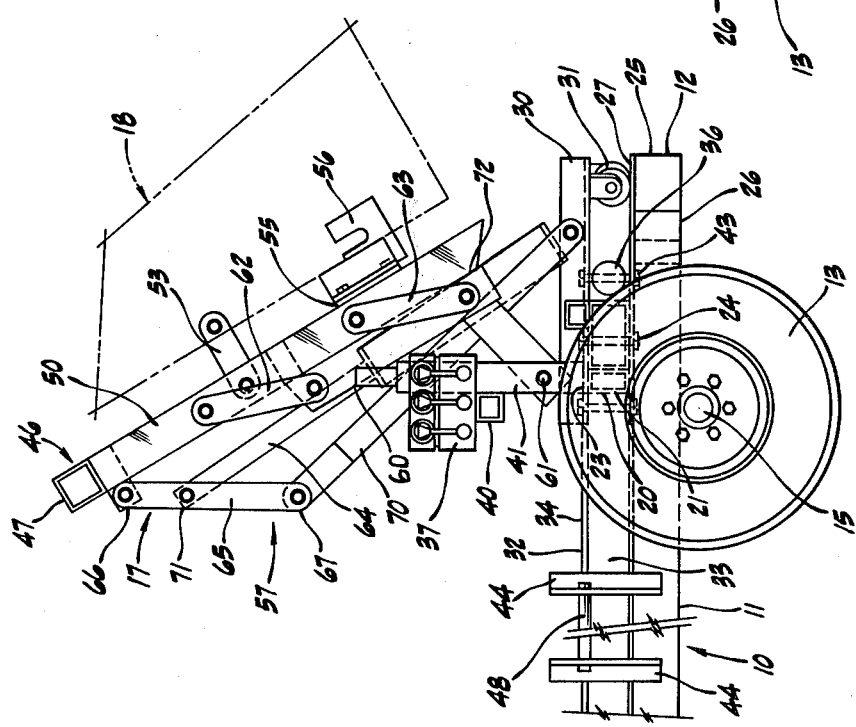
FIG. 4 is a side elevational view of the implement transporter in the lifting position with the lifting mechanism reclined.

The abutments 72 are inclined rearwardly when the lifting frame 46 is in its lowered position, shown in FIG. 1, and while the lifting frame 46 is raised to its raised position shown in FIG. 3 in which the lifting frame 46 abuts the abutment 72. The lifting frame 46 is maintained against the inclined abutments 72 as the lifting frame 46 and brackets 60 are subsequently tilted forwardly about the second pivot means 61 to the reclined position shown in FIG. 4 by the second hydraulic means 64.

It is thought that the structural features and functional advantages of this implement transporter have become fully apparent from the foregoing description of parts, but for completeness of disclosure the operation of the transporter will be briefly discussed.

With the arm 20 in the lifting position and the lifting frame 46 in the lowered position, an implement 18 is connected to the three-point hitch of the hitch link 53 and hooks 56 on the lifting frame 46. The lifting frame 46 and implement 18 are then raised by action of the second hydraulic means 64. The ram 64 extends, raising the first end 66 of the first link 65 and lifts the lifting frame 46. The upper and lower links 62 and 63 provide a four-sided linkage for raising the lifting frame 46, and drawing the lifting frame 46 and implement 18 to a position closer to the second pivot means 61. In this position, the lifting frame 46 abuts the abutments 72 of the brackets 60 as shown in FIG. 3. The ram 64 is then further extended to pivot the lifting frame 46 and implement 18 forwardly and upwardly about the second pivot means 61 to a reclined position shown in FIG. 4.

Figure 7:
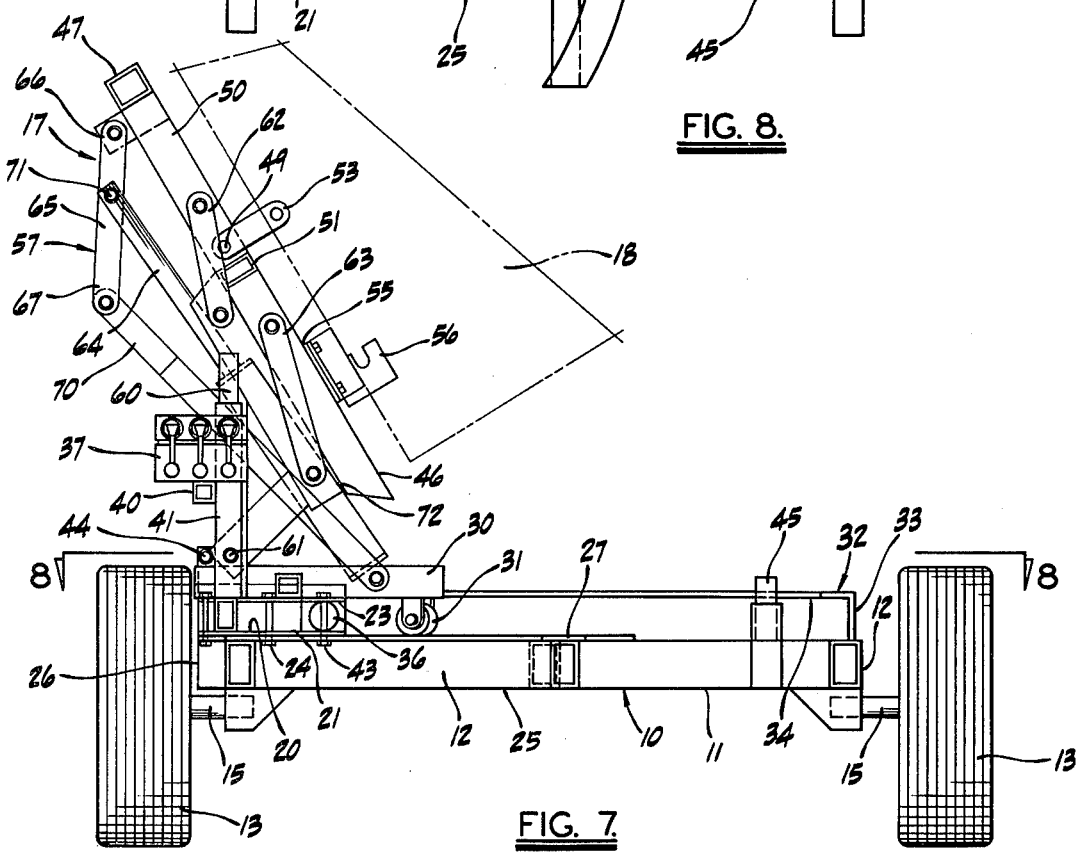
FIG. 7 is a rear elevational view of the implement transporter in the transport position.

The arm 20 carrying the lifting frame 46 and implement 18 can then be rotated from the lifting position to the transport position shown in FIG. 7. This rotation is accomplished by extending the first hydraulic ram 36, causing the arm 20 to pivot about the first pivot means 24. The arm 20 rides on the track 27 with the roller 31 carrying the arm 20. The second end 22 of the arm 20 is retained in a horizontal plane by the retaining member 32. When in the transport position of FIG. 7, the lifting mechanism 17 and the implement 18 are moved close to the side 26 of the trailer 11. This location of the lifting mechanism 17 and implement 18 provides for the carrying of implements of maximum width without overhanging the trailer 11. Also, in the transport position, the center of gravity of the implement 18 is forward of the axes of rotation 15 of the wheels 13 and forward of the midpoint between the axes 15 of wheels 13 and the axes 16 of wheels 14. The trailer 11 carrying the implement 18 can then be pulled to a desired destination.

When it is desired to unload the implement 18, the arm 20 is rotated from the transport position to the lifting position, and the lifting mechanism 17 is actuated to lower the lifting frame 46 from the reclined position to the raised position and then subsequently to the lowered position of FIG. 1, where the implement can be disconnected from the lifting frame 46.

I claim as my invention:

1. An implement transporter including a trailer, comprising:
    (a) two rear wheels on axes of rotation for carrying the trailer,
    (b) a lifting mechanism for lifting an implement carried by the trailer,
    (c) an arm carrying the lifting mechanism, the arm having first and second ends, and
    (d) pivot means pivotably connecting the first end of the arm to the trailer at one side at the rear of the trailer, the lifting mechanism holding the implement with its center of gravity spaced transversely of the trailer from the pivot means in a direction toward the second arm end when the arm is in a lifting position, the arm being pivotable from the lifting position in which the lifting mechanism holds the implement substantially transverse to the rear of the trailer and to a transport position in which the lifting mechanism holds the implement longitudinally of the trailer with the center of gravity of the implement located forwardly of the pivot means and the axes of said rear wheels.

2. An implement transporter as defined in claim 1, in which:
    (e) two front wheels on axes of rotation are in tandem with said rear wheels for carrying the trailer, and
    (f) the lifting mechanism holds the implement longitudinally of the trailer with the center of gravity of the implement located forwardly of the midpoint between the axes of the rear wheels and the axes of the front wheels, the center of gravity of the implement being spaced transversely of the trailer from the pivot means in a direction toward the second arm end when the arm is in the lifting position a distance greater than one-half the distance between the axes of the rear and front wheels.

3. An implement transporter as defined in claim 1, in which:
    (e) hydraulic means are operatively connected to the arm for selective rotation of the arm, the hydraulic means including a hydraulic ram pivotally attached at one end to the arm at a point between the arm ends, the other end of the ram being pivotally attached to the trailer at a point rearwardly and inwardly from the pivot means.

4. An implement transporter including a trailer, comprising:
   (a) two rear wheels on axes of rotation for carrying the trailer,
   (b) a lifting mechanism for lifting an implement carried by the trailer,
   (c) an arm carrying the lifting mechanism, the arm having first and second ends,
   (d) pivot means pivotably connecting the first end of the arm to the trailer at one side at the rear of the trailer, the lifting mechanism holding the implement with its center of gravity spaced from the pivot means in a direction toward the second arm end, the arm being pivotable from a lifting position in which the lifting mechanism holds the implement substantially transverse to the rear of the trailer and to a transport position in which the lifting mechanism holds the implement longitudinally of the trailer with the center of gravity of the implement located forwardly of the axes of said rear wheels,
   (e) the lifting mechanism including:
      1. a lifting frame,
      2. a second pivot means operatively connected to the lifting frame,
      3. a second hydraulic means operatively connected to the lifting frame for raising the lifting frame and attached implement and moving the implement horizontally close to the second pivot means, and for subsequently tilting the lifting frame and implement forwardly and upwardly about the second pivot means so that the implement is located close to said one trailer side when the arm is moved to the transport position, and
      4. a linkage assembly connected to the lifting frame, the linkage assembly operatively connecting the second pivot means to the lifting frame, and the lifting frame and implement being tilted forwardly and upwardly about the pivot means through the linkage assembly,
   (f) the linkage assembly including:
      1. a first link having a first and second ends, the first end being pivotally connected to the lifting frame,
      2. a second link having a first end pivotally carried by the arm and a second end pivotally attached to the second end of the first link, and
      3. the second hydraulic means pivotally carried at one end by the arm, the other end being pivotally connected to the first link between the ends of the first link,
   (g) a bracket pivotally carried by the arm, and
   (h) means attaching the bracket to the lifting frame, the means including upper and lower links, each link being pivotally attached to the bracket at one end and to the lifting frame at the other end for providing a four-sided linkage.

5. An implement transporter as defined in claim 4, in which:
   (i) the lower link is longer than the upper link to provide for arcuate rearward then subsequent forward movement of the bottom of the lifting frame as to the second hydraulic means raises the lifting frame and implement.

6. An implement transporter as defined in claim 4, in which:
   (i) the bracket includes an abutment, the upper and lower links moving the lifting frame against the abutment as the lifting frame is raised to move the implement close to the second pivot means.

7. An implement transporter as defined in claim 6, in which:
   (j) the abutment is inclined rearwardly when the lifting frame is in its lowered position, and the lifting frame is maintained against the inclined abutment when the lifting frame is raised and subsequently tilted forwardly about the second pivot means to its reclined position.

8. An implement transporter including a trailer, comprising:
   (a) two rear wheels on axes of rotation for carrying the trailer,
   (b) a lifting mechanism for lifting an implement carried by the trailer,
   (c) an arm carrying the lifting mechanism, the arm having first and second ends,
   (d) pivot means pivotably connecting the first end of the arm to the trailer at one side at the rear of the trailer, the lifting mechanism holding the implement with its center of gravity spaced from the pivot means in a direction toward the second arm end, the arm being pivotable from a lifting position in which the lifting mechanism holds the implement substantially transverse to the rear of the trailer and to a transport position in which the lifting mechanism holds the implement longitudinally of the trailer with the center of gravity of the implement located forwardly of the axes of said rear wheels,
   (e) the lifting mechanism including:
      1. a lifting frame,
      2. a second pivot means operatively connected to the lifting frame, and
      3. a second hydraulic means operatively connected to the lifting frame for raising the lifting frame and attached implement and moving the implement horizontally close to the second pivot means, and for subsequently tilting the lifting frame and implement forwardly and upwardly about the second pivot means so that the implement is located close to said one trailer side when the arm is moved to the transport position,
   (f) the lifting mechanism further includes a linkage assembly connected to the lifting frame, the linkage assembly operatively connecting the second pivot means to the lifting frame, and the lifting frame and implement being tilted forwardly about the pivot means through the linkage assembly,
   (g) the lifting frame including an upper horizontal bar and two spaced vertical bars attached to the upper horizontal bar,
   (h) the linkage assembly including:
      1. a first link having a first and second ends, the first end being pivotally connected to the lifting frame at the center of the upper horizontal bar,
      2. a second link having a first end pivotally carried by the arm and a second end pivotally attached to the second end of the first link, and
      3. the second hydraulic means pivotally carried at one end by the arm, the other end being pivotally connected to the first link between the ends of the first link,
   (i) two brackets pivotally carried by the arm at the second pivot means, (j) means attaching one of the brackets to one of the vertical bars and the other bracket to the other vertical bar, the last said means including sets of upper and lower links, each link being pivotally attached to its associated bracket at one end and to one of the vertical bars at the other end for providing a four-sided linkage, and (k) the bracket including abutments, the upper and lower links moving the vertical bars of the lifting frame against the abutments as the lifting frame is raised to move the implement closer to the second pivot means.

9. An implement transporter as defined in claim 1, in which:

(e) the lifting mechanism includes:
 1. a lifting frame,
 2. a second pivot means operatively connecting the lifting frame to the arm, and
 3. a hydraulic means operatively connected to the lifting frame for raising the lifting frame and attached implement, (f) a bracket is pivotally carried by the arm by the second pivot means, and (g) means attaches the bracket to the lifting frame, the means including upper and lower links, each link being pivotally attached to the bracket at one end and to the lifting frame at the other end for providing a four-sided linkage.

10. An implement transporter as defined in claim 9, in which:

(h) the lower link is longer than the upper link to provide for arcuate rearward then subsequent forward movement of the bottom of the lifting frame as the hydraulic means raises the lifting frame and implement.

11. An implement transporter as defined in claim 9, in which:

(h) the bracket includes an abutment, the upper and lower links moving the lifting frame against the abutment as the lifting frame is raised to move the implement close to the second pivot means.

12. An implement transporter as defined in claim 11, in which:

(i) the abutment is inclined rearwardly when the lifting frame is in its lowered position, and the lifting frame is maintained against the inclined abutment when the lifting frame is raised and subsequently tilted forwardly about the second pivot means to its reclined position.

* * * * *